March 23, 1965  L. HORN ETAL  3,174,219
METHOD OF MAKING A SINTERED ELECTRODE
Filed Dec. 9, 1959  3 Sheets-Sheet 1

FIG. I

INVENTORS
Lutz Horn
Fritz Philipp
BY
Michael S. Striker
Attorney

March 23, 1965 L. HORN ETAL 3,174,219
METHOD OF MAKING A SINTERED ELECTRODE
Filed Dec. 9, 1959 3 Sheets-Sheet 3

INVENTORS
Lutz Horn
Fritz Philipp
BY
Michael S. Striker
attorney

United States Patent Office 3,174,219
Patented Mar. 23, 1965

3,174,219
METHOD OF MAKING A SINTERED ELECTRODE
Lutz Horn, Hagen, Westphalia, and Fritz Philipp, Hagen-Haspe, Westphalia, Germany, assignors to Varta Aktiengesellschaft
Filed Dec. 9, 1959, Ser. No. 858,350
Claims priority, application Germany, Dec. 12, 1958,
A 30,923
12 Claims. (Cl. 29—420.5)

The present invention relates to a sinter electrode and to a method of making the same. More particularly, the present invention relates to the production of sinter electrodes which are suitable for use in alkaline storage batteries.

It has been attempted to reinforce sintered foil electrodes by using steel strips as carriers for the fine nickel powder such as carbonyl nickel powder (nickel powder which has been precipitated from carbonyl nickel vapors) during the sintering of the nickel powder. However, sinter electrodes made in this manner can be produced by application of the nickel powder only to one face of the thin steel carrier strip.

It has also been suggested to embed stretch metal or nickel mesh in the nickel powder prior to sintering of the same. However, to thus embed reinforcing structures in the nickel powder is rather difficult due to the fact that the nickel powder layer which is to be sintered is very thin. Furthermore, in connection with all of the above discussed methods, the difficulty is encountered that the layer of finely subdivided nickel powder which is to be sintered will shrink when subjected to the sintering temperatures and thereby cracks and enlarged pores will be formed in the sintered layer which adheres to the reinforcing structure. Such cracks and enlarged pores are highly disadvantageous during the subsequent impregnation of the sintered electrode skeleton with active mass and during the formation and operation of the battery in which such electrodes are installed. In fact, imperfections such as discussed above, might lead to destruction of the sinter electrode structure.

It is therefore an object of the present invention to provide a method of producing reinforced sinter electrodes which will not be subject to the above discussed disadvantages.

It is a further object of the present invention to provide a sinter electrode which can be impregnated with active mass and operated without encountering the above discussed difficulties.

It is another object of the present invention to provide a reinforced sinter electrode having a substantially even porous sintered structure of desired degree of porosity, firmly united with a reinforcing member so as to form a unitary electrode structure of the desired great mechanical strength and of very long useful life span.

Other objects and advantages of the present invention will become apparent from a further reading of the description and the appended claims.

With the above and other objects in view, the present invention contemplates a method of producing a sinter electrode, which method comprises the steps of forming a layer consisting essentially of distinct finely subdivided metal particles adapted to be sintered, sintering the layer so as to form a coherent porous sintered sheet consisting of the metal particles sintered to each other, and pressing one face of the sintered sheet and one face of a perforated metallic reinforcing sheet against each other so as to force part of the sintered sheet into the perforations of the perforated metal sheet, whereby the porous sintered sheet and the reinforcing sheet are united forming a unitary reinforced electrode structure.

According to a preferred embodiment of the present invention, the method of producing the sinter electrode comprises the steps of forming on a support a layer of predetermined thickness consisting essentially of distinct finely subdivided metal particles adapted to be sintered, sintering the layer so as to form a coherent porous sintered sheet consisting of the metal particles sintered to each other, and pressing one face of the sintered sheet and one face of a perforated metallic reinforcing sheet formed with outwardly extending burrs at least partially surrounding the perforations, against each other with the burrs penetrating the sintered sheet so as to compress the sintered sheet, to bend the outermost portions of the burrs and to force portions of the sintered sheet into the perforations of the perforated metal sheet substantially filling the same, whereby the sintered sheet and the reinforcing sheet are united forming a unitary reinforced electrode structure.

According to another preferred embodiment of the present invention, it is contemplated to produce a sinter electrode by forming on a support a layer consisting essentially of distinct finely subdivided nickel particles, sintering the layer at a temperature of between 600° and about 900° C. on the support so as to form a coherent porous sintered sheet consisting of nickel particles sintered to each other, separating the thus formed coherent sintered sheet from the support and pressing one face of the sintered sheet and one face of a perforated metallic reinforcing sheet against each other so as to compress the sintered sheet and to force portions of the sintered sheet into the perforations of the perforated metallic sheet substantially filling the same, whereby the porous sintered sheet and the reinforcing sheet are united forming a unitary reinforced electrode structure, the steps of separating and pressing being carried out in any desired sequence.

The present invention also includes a sinter electrode structure which comprises, in combination, a perforated supporting metal sheet, and a coherent porous sheet of sintered metal particles superposed upon one face of the perforated supporting sheet substantially completely covering the same and extending into the perforations thereof, whereby a reinforced metallic sinter electrode structure is formed consisting of the sintered sheet and of the perforated metal sheet firmly connected to each other.

According to another preferred embodiment of the present invention, the sinter electrodes also comprise, in combination, a perforated supporting metal sheet being formed with burrs at least partially surrounding the perforations and extending outwardly from one face of the perforated supporting metal sheet, and a coherent porous sheet of sintered metal particles having one face superposed upon the one face of the perforated supporting metal sheet substantially completely covering the same and extending into the perforations thereof, the burrs of the supporting sheet comprising main portions penetrating through the porous sheet of sintered metal particles and bent end portions substantially located in the plane of the other face of the coherent sintered sheet gripping the same, whereby a reinforced metallic sinter electrode structure is formed consisting of the sintered sheet and of the perforated supporting metal sheet firmly connected to each other.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 5:
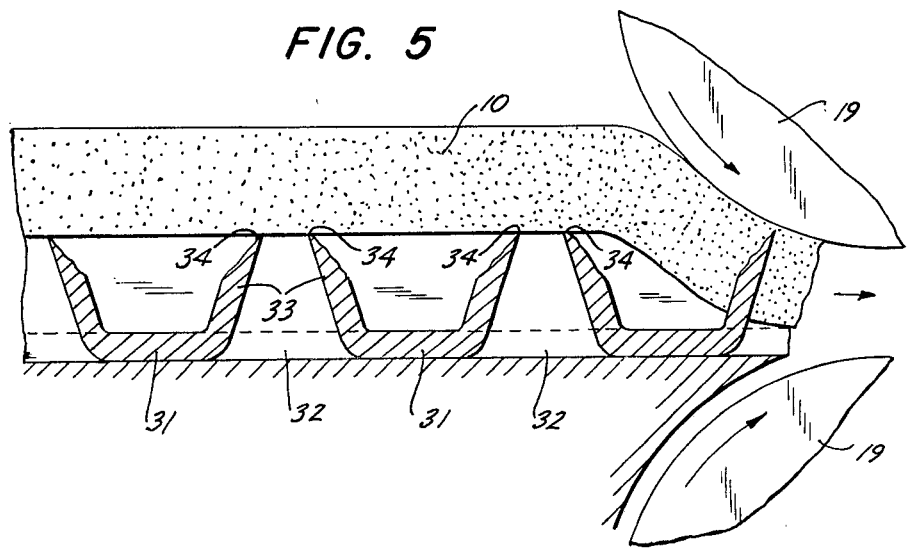
FIG. 5 is a fragmentary cross-sectional view corresponding to a view taken along lines V—V of FIG. 2 and showing a portion of the perforated metal sheet of FIG. 2 after the same has been placed in contact with the coherent sinter sheet, and while the porous coherent sintered mass is pressed into the perforations of the reinforcing sheet.
Figure 6:
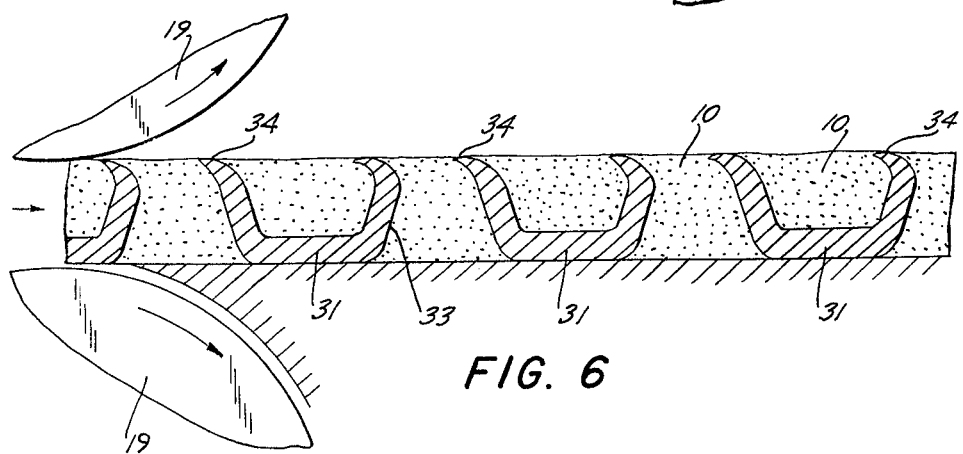

FIG. 6 corresponds to the view of FIG. 5, however, after the perforated reinforcing sheet and the sintered mass have passed through the pressure rollers shown at the right-hand part of FIG. 5.

Figure 1:
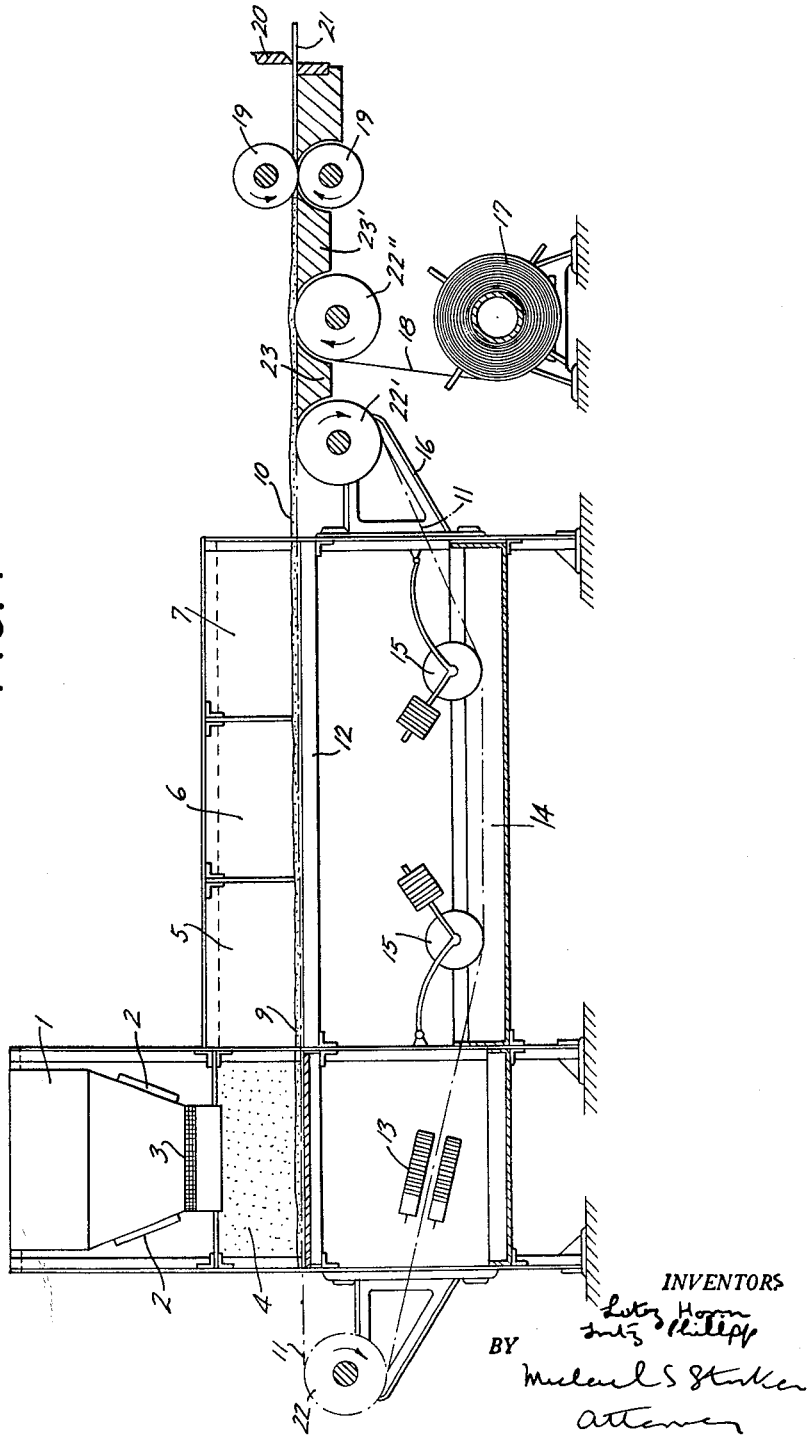
FIG. 1 is a schematic elevational view, partially in cross section, of a device for producing the sinter electrode according to the present invention.

Referring now to the drawings, and particularly to FIG. 1, the finely subdivided metal powder such as carbonyl nickel powder will be introduced through hopper 1 provided in its lower portion with vibrators 2 and downwardly terminating in a metal screen 3. Upon operation of vibrators 2, the metal powder will pass through screen 3 and will flow downwardly onto an endless belt support 11. The metal powder flowing downwardly from screen 3 to endless belt support 11 is indicated by reference numeral 4. Endless belt support 11 is operated by a pulley drive 22. A layer 9 of metal powder is formed on endless belt support 11 and passes upon movement of the endless belt support through drying zone 5 of a sintering furnace including in addition to drying zone 5 the sintering zone 6 and cooling zone 7. Layer 9 of the metal powder passes through the entire sintering furnace and while passing through sintering zone 6, layer 9 will be sintered so as to form a coherent sheet. A protective gas atmosphere is maintained in sintering zone 6 and preferably also in cooling zone 7 of the sintering furnace. The sintered sheet formed of the metal powder layer 9 and indicated by reference numeral 10 leaves the sintering furnace and is then separated from endless belt support 11 which turns downwardly about pulley 22′ with the help of scraper 1G, while the sintered sheet 10 is then supported by table 23. Endless belt support 11 is in turn supported while passing through the sintering furnace i.e. while passing through zones 5, 6 and 7, by heat insulating ceramic plates identified by reference numeral 12.

Endless belt support 11, after turning about pulley 22′, will then pass through a magnesium oxide containing bath 14 and maintained therein below the surface of the bath by tension pulleys 15. From bath 14, the endless belt support will pass between heating elements 13 which serve for drying the endless belt support, and from there about pulley 22 and then again underneath hopper 1.

A roll 17 of perforated metal reinforcing sheet 18, feeds the perforated metal reinforcing sheet about guide roller 22″ onto table 23′ so that the sintered metal layer 10 will be superposed upon perforated metal sheet 18. Perforated metal sheet 18 with the sintered metal layer thereon passes then through pressure rollers 19, and thereby, the sintered metal powder layer is compressed and pressed partly into the perforations of metal sheet or band 18. The thus formed electrode structure passes then through cutter 20 and is cut by operation of cutter 20 into sinter electrode strips 21 of desired width.

Figure 2:
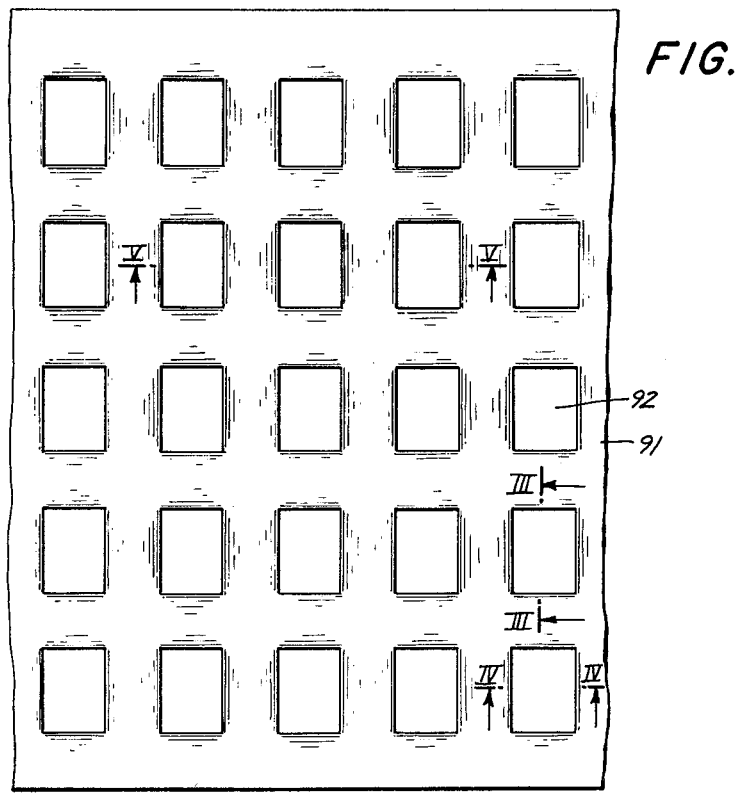
FIG. 2 is a fragmentary plane view of a portion of a perforated metallic reinforcing sheet as used in accordance with the present invention.

Referring now to FIG. 2, the same shows a perforated metal support sheet 91 formed with perforations 92, identical to sheet 18 of FIG. 1.

Figure 4:
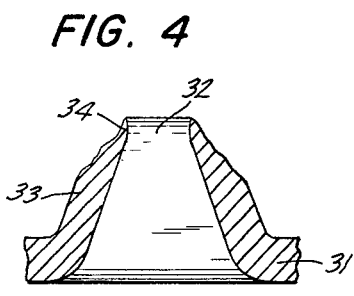
FIG. 4 is an elevational cross-sectional view taken along the lines IV—IV of FIG. 2.
Figure 3:
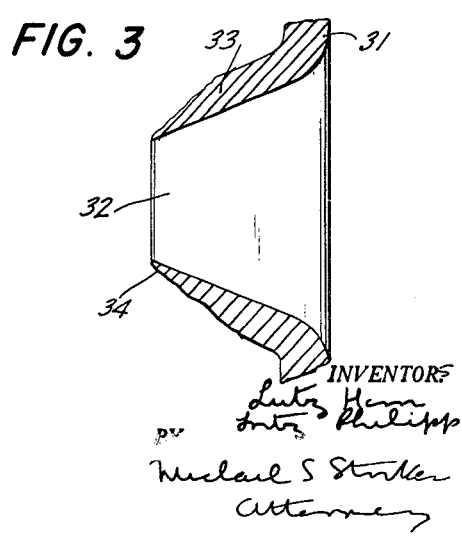
FIG. 3 is an enlarged cross-sectional view taken along the lines III—III of FIG. 2.

FIG. 3 is a cross-sectional view taken along lines III—III of FIG. 2 and shows, greatly enlarged, burrs 33 which extend outwardly from and obliquely to sheet 31 surrounding perforations 32 and terminating in free end portions 34. FIG. 4 is a view similar to the view of FIG. 3 but taken along line IV—IV.

The forming of the sinter electrode according to the present invention from a sintered metal powder sheet or layer such as the sintered layer 10 shown in FIG. 1 and of a perforated reinforcing sheet such as the band 18 of FIG. 1, or the sheet 91 of FIG. 2, is illustrated in FIGS. 5–6.

FIG. 5 shows the sintered layer 10 superposed upon and carried by perforated sheet 31, and—in the right-hand portion of FIG. 5, the passing of perforated support sheets 31 and superposed sintered layer 10 through pressure rollers 19. It can be seen how the sintered layer is pressed into the perforations of support sheet 31 and how simultaneously the thickness of the sintered layer is reduced.

As illustrated in FIG. 6, the pressure rollers may be so adjusted that the distance between the same is less than the height of burrs 33, so that not only the sintered layer 10 will be pressed into the perforations 32 of sheet 31, but also the free end portions 34 of burrs 33 will be bent as illustrated whereby it will be achieved that the thus bent burrs will form a firm grip on the compressed sintered sheet 10.

Thus, according to the present invention, sinter electrodes can be produced which consist of a perforated metal support to one face of which the sintered metal adheres.

Preferably, highly subdivided metal powder such as carbonyl nickel powder, is used to form a loose layer having a thickness of between 0.3 and 1.0 mm., which layer is then subjected to sintering prior to being placed in contact with the perforated metal support. No pressure need or, in fact, should be applied to the loose layer of metal powder. Only after a sintered coherent layer has been formed of the metal powder and has been separated from the endless belt support and contacted by the perforated metal support sheet is pressure applied, for instance, by passing the thus formed sandwich structure between a pair of pressure rollers. The electrode produced in this manner combine mechanical stability with flexibility. Furthermore, the thus formed sinter electrode is of homogeneous structure, contains pores of substantially even size and is free of cracks or enlarged hollow spaces.

It has been found to be particularly advantageous to use for production of the above described electrodes a perforated metal band as reinforcing sheet, which metal band has a thickness of between 0.03 and 0.1 mm., preferably between 0.04 and 0.05 mm.

Furthermore, it is preferred according to the present invention, to use a reinforcing perforated metal band having burrs or outwardly extending portions the height of which is substantially equal to the thickness of the finished sinter electrode. In this manner, a particularly stable and permanent connection between the sintered structure and the perforated support band can be achieved.

It is another advantage of the method of the present invention that, by suitably choosing the pressure with which the sintered layer is pressed against the perforated metal support band and by arranging sides and spacing of the perforations in the metal support band in accordance with the desired result, it is possible to produce sintered electrodes of any desired degree of stability and to predetermine the pore volume in the sinter electrode. In this connection, it has been found particularly advantageous to compress the lateral edge portions of the electrode band which pass through the pressure roller more strongly than the center portion between these edge portions.

Due to the very high stability of the electrode produced according to the present invention, it is also possible to further increase the surface area of the active mass by profiling the same.

Sintering is preferably carried out at a temperature of between 600° and 1000° C., and most preferably at about 900° C. when carbonyl nickel powder, i.e. nickel powder formed of nickel carbonyl vapors, is to be sintered.

Due to the fact that in accordance with the preferred embodiments of the present invention, the highly porous sintered nickel layer is gripped by the burrs of the perforated metal support sheet, a firm anchoring of the sintered layer with the perforated metal support sheet is achieved and this also results in an improvement of the conductivity of the electrode so that charging and discharging can be carried out with higher current density.

Since sintering of the nickel powder or the like takes place prior to contact between the same and the perforated metal support sheet, the difference in the thermal expansion coefficients of the metal powder, on the one hand, and of the perforated support sheet will be of no significance. Thus, according to the present invention, the cracks and cavities which are formed in the sintered layer when the same is sintered on a metal support band and which are due to the difference in the thermal expansion coefficients between the sintered metal powder and the metallic support, will not occur according to the present invention.

As perforated metal support sheet or band, preferably a nickel plated steel foil is used.

The nickel plated steel band or foil is then perforated, however, contrary to usual practice, the burrs formed in connection with perforation of the steel foil are not removed. The width of the nickel plated steel band is preferably, however without limiting the present invention to the specific dimensions given herein, between about 100 and 1000 mm. and the sinter electrode band formed thereof is subsequently cut to the desired width, usually between 4 and 200 mm.

It has been found that the thickness of the nickel plated steel foil preferably should not exceed 0.1 mm. and that it is preferred to use a perforated reinforcing sheet having a thickness of between 0.04 and 0.05 mm.

The individual perforations may be of square shape having an edge length of between 0.1 and 0.5 mm., or of rectangular shape wherein one pair of edges will have a length of between 0.1 and 0.5 mm. and the other pair of edges a length of between 0.2 and 1.0 mm. Preferably, the edge length of rectangular perforations will be 0.15 and 0.25 mm. Circular perforations may have a diameter of between 0.2 and 2.5 mm. and triangular perforations a height of between 0.1 and 3 mm. The dimensions of the perforations are so chosen that the burrs formed by perforating the metal foil will at least have the height of the compressed sinter layer. Thus, the height of the burrs which are obtained by forming triangular perforations having an edge length of 0.5 mm. will be between about 0.21 and 0.23 mm., and the height of burrs formed with square perforations having an edge length of 0.7 mm. will be between 0.28 and 0.31 mm.

The thickness of the sintered layer of pulverulent nickel or the like will depend on the speed of the endless support band which preferably will be between 0.15 and 15 mm. per second and on oscillation frequency of the vibrators (preferably about 50 hertz), so that the thickness of the pulverulent layer can be adjusted by changing the amplitude of the vibrator. Preferably, the thickness of the pulverulent layer will be so chosen as to be about twice the desired thickness of the electrode.

The individual particles of the pulverulent nickel powder should have a size of not exceeding 10 microns, and preferably, the height of the pulverulent layer will be between 0.3 and 1.0 mm. The pore volume after sintering will preferably be maintained at between 90 and 95% and will then be reduced by compressing the sintered layer in contact with the perforated support sheet, for instance by passing the sandwich layer through pressure rollers, to preferably between 60 and 85%, however, it is also possible in this manner to reduce the pore volume to as little as about 30%. The pore volume is primarily controlled by the distance of the two pressure rollers from each other.

In place of nickel powder which has been produced by thermal decomposition of nickel carbonyl vapors, it is also possible to use other metal powders such as nickel powder which has been produced in powder form by electrolytic methods, or a powder which has been formed of solutions of nickel salts by cementing with less noble metals.

Preferred ways of carrying out the method of the present invention are described in three examples which follow in table form.

*Table I*

|  | Example I | Example II | Example III |
| --- | --- | --- | --- |
| Speed of Endless Carrier Belt Carrying Pulverulent Nickel Through Sinter Furnace (in meter/hour). | 12 | 0.67 | 2. |
| Frequency of Vibrator (in Hertz). | 50 | 50 | 50. |
| Particle Size of Nickel Powder (in microns). | 0 to 10 | 0 to 10 | 0 to 10. |
| Sintering Temperature | 1,000° C | 800° C | 900° C. |
| Sintering Time | 10 Minutes | 3 Hours | 1 Hour. |
| Pore Volume After Passing Through Pressure Rollers. | 80% | 82% | 85%. |
| Thickness of Compressed Sintered Layer. | 0.6 mm | 0.4 mm | 0.5 mm. |
| Physical Appearance | Cutting edges of metallic appearance, homogeneous sintered layer, flexible, sintered layer firmly coherent. | | |

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of producing a sinter electrode, comprising the steps of forming a layer consisting essentially of distinct finely subdivided metal particles adapted to be sintered; sintering said layer so as to form without application of pressure a coherent porous sintered sheet consisting of said metal particles sintered to each other; and pressing one face of said coherent porous sintered sheet and one face of a perforated metallic reinforcing sheet, formed with burrs extending outwardly from and obliquely to said reinforcing sheet and at least partially surrounding the perforations of said reinforcing sheet, against each other so as to compress said sintered sheet, to force portions of said sintered sheet into the perforations of said perforated metal sheet substantially filling the same and simultaneously forcing said burrs to penetrate throughout the thickness of said sintered sheet, whereby said porous sintered sheet and said reinforcing sheet are united and anchored to each other by said burrs, forming a unitary reinforced electrode structure.

2. A method of producing a sinter electrode, comprising the steps of forming a layer consisting essentially of distinct finely subdivided metal particles adapted to be sintered; sintering said layer so as to form without application of pressure a coherent porous sintered sheet consisting of said metal particles sintered to each other; and pressing one face of said coherent porous sintered sheet and one face of a perforated metallic reinforcing sheet, formed with burrs extending outwardly from and obliquely to said reinforcing sheet and at least partially surrounding the perforations of said reinforcing sheet, against each other so as to compress said sintered sheet, to force portions of said sintered sheet into the perforations of said perforated metal sheet substantially filling the same and simultaneously forcing said burrs to penetrate throughout the thickness of said sintered sheet, whereby said porous sintered sheet and said reinforcing sheet are united and anchored to each other by said burrs, forming a unitary reinforced electrode structure.

3. A method of producing a sinter electrode, comprising the steps of forming on a support a layer consisting essentially of distinct finely subdivided metal particles adapted to be sintered; sintering said layer on said support so as to form without application of pressure a coherent porous sintered sheet consisting of said metal particles sintered to each other; separating the thus formed coherent sintered sheet from said support; and pressing one face of said coherent porous sintered sheet and one face of a perforated metallic reinforcing sheet, formed with burrs extending outwardly from and obliquely to said reinforcing sheet and at least partially surrounding the perforations of said reinforcing sheet, against each other so as to compress said sintered sheet, to force portions of said sintered sheet into the perforations of said perforated metal sheet substantially filling the same and simultaneously forcing said burrs to penetrate throughout the thickness of said sintered sheet, whereby said porous sintered sheet and said reinforcing sheet are united and anchored to each other by said burrs, forming a unitary reinforced electrode structure.

4. A method of producing a sinter electrode, comprising the steps of forming on a support a layer consisting essentially of distinct finely subdivided metal particles adapted to be sintered; sintering said layer on said support so as to form without application of pressure a coherent porous sintered sheet consisting of said metal particles sintered to each other; separating the thus formed coherent sintered sheet from said support; and pressing one face of said coherent porous sintered sheet and one face of a perforated metallic reinforcing sheet, formed with burrs at least partially surrounding the perforations of said reinforcing sheet, against each other so as to compress said sintered sheet, to force portions of said sintered sheet into the perforations of said perforated metal sheet substantially filling the same and simultaneously forcing said burrs to penetrate throughout the thickness of said sintered sheet and to bend the outermost portions of said burrs thereby gripping said sintered sheet, whereby said porous sintered sheet and said reinforcing sheet are united forming a unitary reinforced electrode structure, said steps of separating and pressing being carried out in any desired sequence.

5. A method of producing a sinter electrode, comprising the steps of forming on a moving endless support band a layer consisting essentially of distinct finely subdivided metal particles adapted to be sintered; sintering said layer on said moving endless support band so as to form without application of pressure a coherent porous sintered sheet consisting of said metal particles sintered to each other; separating the thus formed coherent sintered sheet from said moving endless support band; and passing said coherent porous sintered sheet and a perforated metallic reinforcing sheet, formed with burrs extending outwardly from and obliquely to said reinforcing sheet and at least partially surrounding the perforations of said reinforcing sheet, in face to face contact between a pair of pressure rollers so as to compress said sintered sheet and to force portions of said sintered sheet into the perforations of said perforated metal sheet substantially filling the same and simultaneously forcing said burrs to penetrate throughout the thickness of said sintered sheet, whereby said porous sintered sheet and said reinforcing sheet are united and anchored to each other by said burrs, forming a unitary reinforced electrode structure.

6. A method according to claim 5, wherein the pressure exerted by said pressure rollers on the lateral portions of said sheets is greater than the pressure exerted on the portion of said sheets intermediate said lateral portions thereof.

7. A method of producing a sinter electrode, comprising the steps of forming a layer consisting essentially of distinct finely subdivided nickel particles, said layer having a thickness of between about 0.3 and 1.0 mm.; sintering said layer so as to form without application of pressure a coherent porous sintered sheet consisting of said nickel particles sintered to each other; and pressing one face of said coherent porous sintered sheet and one face of a perforated metallic reinforcing sheet, formed with burrs at least partially surrounding the perforations of said reinforcing sheet, against each other so as to compress said sintered sheet, to force portions of said sintered sheet into the perforations of said perforated metal sheet substantially filling the same, simultaneously forcing said burrs to penetrate throughout the thickness of said sintered sheet and to bend the outermost portions of said burrs thereby gripping said sintered sheet, whereby said porous sintered sheet and said reinforcing sheet are united forming a unitary reinforced electrode structure.

8. A method of producing a sinter electrode, comprising the steps of forming a layer consisting essentially of distinct finely subdivided nickel particles, said layer having a thickness of between about 0.3 and 1.0 mm.; sintering said layer so as to form without application of pressure a coherent porous sintered sheet consisting of said nickel particles sintered to each other; and pressing one face of said coherent porous sintered sheet and one face of a perforated metallic reinforcing sheet having a thickness of between about 0.03 and 0.10 mm. and formed with burrs at least partially surrounding the perforations of said reinforcing sheet, against each other so as to compress said sintered sheet and to force portions of said sintered sheet into the perforations of said perforated metal sheet substantially filling the same, simultaneously forcing said burrs to penetrate throughout the thickness of said sintered sheet and to bend the outermost portion of said burrs thereby gripping said sintered sheet, whereby said porous sintered sheet and said reinforcing sheet are united forming a unitary reinforced electrode structure.

9. A method of producing a sinter electrode, comprising the steps of forming a layer consisting essentially of distinct finely subdivided nickel particles, said layer having a thickness of between about 0.3 and 1.0 mm.; sintering said layer so as to form without application of pressure a coherent porous sintered sheet consisting of said nickel particles sintered to each other; and pressing one face of said coherent porous sintered sheet and one face of a perforated metallic reinforcing sheet having a thickness of between about 0.04–0.05 mm., and formed with burrs at least partially surrounding the perforations of said reinforcing sheet, against each other so as to compress said sintered sheet and to force portions of said sintered sheet into the perforations of said perforated metal sheet substantially filling the same, simultaneously forcing said burrs to penetrate throughout the thickness of said sintered sheet and to bend the outermost portions of said burrs thereby gripping said sintered sheet, whereby said porous sintered sheet and said reinforcing sheet are united forming a unitary reinforced electrode structure.

10. A method of producing a sinter electrode, comprising the steps of forming on a support a layer of predetermined thickness consisting essentially of distinct finely subdivided metal particles adapted to be sintered; sintering said layer so as to form without application of pressure a coherent porous sintered sheet consisting of said metal particles sintered to each other; separating said sintered sheet from said support; and pressing one face of said coherent porous sintered sheet and one face of a perforated metallic reinforcing sheet, formed with projections of a predetermined height being less than said predetermined thickness, said projections extending outwardly from and obliquely to said perforated metallic reinforcing sheet, against each other so as to compress said sintered sheet to said predetermined height thereby forcing said projections through the entire thickness of the thus-compressed sheet and forcing portions of said sintered sheet into the perforations of said perforated metal sheet substantially filling the same, whereby said compressed sintered sheet is united with said reinforcing sheet and firmly anchored thereto by said projections extending through said sintered sheet, to form a unitary reinforced electrode structure.

11. A method of producing a sinter electrode, comprising the steps of forming on a support a layer of predetermined thickness consisting essentially of distinct finely subdivided metal particles adapted to be sintered; sintering said layer so as to form without application of pressure a coherent porous sintered sheet consisting of said metal particles sintered to each other; separating said sintered sheet from said support; and pressing one face of said coherent porous sintered sheet and one face of a perforated metallic reinforcing sheet, formed with outwardly extending burrs at least partially surrounding said perforations, against each other with said burrs penetrating said sintered sheet so as to compress said sintered sheet, to bend the outermost portions of said burrs and to force portions of said sintered sheet into the perforations of said perforated metal sheet substantially filling the same, whereby said compressed sintered sheet is united with said reinforcing sheet and firmly anchored thereto by said bent burrs to form a unitary reinforced electrode structure.

12. In a method of producing a sinter electrode, the steps of forming on a support a layer consisting essentially of distinct finely subdivided nickel particles; sintering said layer without application of pressure at a temperature of about 900° C. on said support so as to form a coherent porous sintered sheet consisting of said nickel particles sintered to each other; separating the thus formed coherent sintered sheet from said support; and pressing one face of said sintered sheet and one face of a perforated metallic reinforcing sheet, formed with burrs extending outwardly from and obliquely to said reinforcing sheet, against each other so as to compress said sintered sheet and to force portions of said sintered sheet into the perforations of said perforated metal sheet substantially filling the same, whereby said porous sintered sheet and said reinforcing sheet are united forming a unitary reinforcing electrode structure, said steps of separating and pressing being carried out in any desired sequence.

References Cited by the Examiner

UNITED STATES PATENTS

| | | | |
|---|---|---|---|
| 1,067,991 | 7/13 | Kroger | 29—523 |
| 1,729,747 | 10/29 | Palm. | |
| 2,222,251 | 11/40 | Calkins et al. | |
| 2,488,731 | 11/49 | Lambert et al. | 29—182.3 |
| 2,544,112 | 3/51 | Schneider. | |
| 2,663,072 | 12/53 | Pfistershammer | 29—521 |
| 2,675,418 | 4/54 | Nichols | 29—420 X |
| 2,681,375 | 6/54 | Vogt | 29—420 X |
| 2,683,671 | 7/54 | Findlay et al. | 29—182.3 |
| 2,683,927 | 7/54 | Maronek | 29—521 |
| 2,746,741 | 5/56 | Naeser | 29—420.5 X |
| 2,861,115 | 11/58 | Berg | 136—28 |
| 2,888,742 | 6/59 | Stumbock | 29—521 X |
| 3,002,834 | 10/61 | Di Pasquale. | |

FOREIGN PATENTS 21,538    12/00    Great Britain.

WHITMORE A. WILTZ, *Primary Examiner.*

WILLIAM G. WILES, *Examiner.*